United States Patent [19]

Powell, II et al.

[11] Patent Number: 5,656,782

[45] Date of Patent: Aug. 12, 1997

[54] PRESSURE SEALED HOUSING APPARATUS AND METHODS

[75] Inventors: Roger E. Powell, II, North Smithfield, R.I.; Simon Korowitz, Sharon, Mass.; John P. Angelosanto, North Attleboro, Mass.; Edwin L. Karas, Mansfield, Mass.

[73] Assignee: The Foxboro Company, Foxboro, Mass.

[21] Appl. No.: 449,104

[22] Filed: May 24, 1995

Related U.S. Application Data

[63] Continuation-in-part of Ser. No. 32,041, Dec. 6, 1994, Pat. No. Des. 366,000.

[51] Int. Cl.$^6$ .................................................. G01L 7/00
[52] U.S. Cl. ................................................................ 73/756
[58] Field of Search ........................... 73/706, 708, 718, 73/721, 727, 756, 861.47; 137/84; 361/18, 816

[56] References Cited

U.S. PATENT DOCUMENTS

| | | | |
|---|---|---|---|
| 3,247,719 | 4/1966 | Chelner | 73/420 |
| 3,869,920 | 3/1975 | Miyauchi et al. | 73/398 R |
| 4,085,620 | 4/1978 | Tanaka | 73/727 |
| 4,172,388 | 10/1979 | Gabrielson | 73/721 |
| 4,176,557 | 12/1979 | Johnston | 73/708 |
| 4,414,851 | 11/1983 | Maglic | 73/706 |
| 4,466,290 | 8/1984 | Frick | 73/756 |
| 4,653,330 | 3/1987 | Hedtke | 73/756 |
| 4,748,852 | 6/1988 | Frick | 73/718 |
| 4,760,859 | 8/1988 | Brown | 137/84 |
| 4,833,922 | 5/1989 | Frick et al. | 73/756 |
| 4,958,938 | 9/1990 | Schwartz et al. | 374/208 |
| 4,986,126 | 1/1991 | Lawless | 73/708 |
| 5,014,557 | 5/1991 | Lawless | 73/756 |
| 5,179,488 | 1/1993 | Rovner | 361/18 |
| 5,278,543 | 1/1994 | Orth et al. | 340/825 |
| 5,287,746 | 2/1994 | Broden | 73/706 |
| 5,351,510 | 10/1994 | Alden | 70/63 |
| 5,353,200 | 10/1994 | Bodin et al. | 361/816 |
| 5,353,289 | 10/1994 | Ohkawa | 371/23 |

FOREIGN PATENT DOCUMENTS

WO93/21506  10/1993  WIPO.

Primary Examiner—George M. Dombroske
Assistant Examiner—William L. Oen
Attorney, Agent, or Firm—Lahive & Cockfield, LLP

[57] ABSTRACT

A selectively pressured housing apparatus comprising a body, a wall member, an aperture, and a mounting seat. The body has a chamber therein extending along a first axis, is open at a first axial end and a second axial end, and has a port extending along a second axis transverse to the first axis. The port communicates with the chamber. The wall member is inside of the body and extends transverse to the first axis and parallel to the second axis and divides the chamber into first and second compartments, axially spaced along the first axis. The port communicating with the chamber is in the second compartment. The aperture extends through the wall member and connects the first and second compartments. The mounting seat is on the wall member and extends circumferentially about the aperture for removably and replaceably seating an element with a selected pressure seal to the wall member. According to one preferred embodiment, the first and second compartments are employed for housing process electronics associated with a differential pressure transmitter.

47 Claims, 9 Drawing Sheets

PRESSURE SEALED HOUSING APPARATUS AND METHODS

REFERENCE TO RELATED PATENTS

This application is a continuation-in-part of U.S. patent application Ser. No. 29/032,041, filed Dec. 6, 1994, now U.S. Pat. No. 366,000 entitled "Pressure Housing." The above cited patent application, assigned to a common assignee, The Foxboro Company, Foxboro, Mass., is incorporated herein by reference.

BACKGROUND OF THE INVENTION

This invention relates to housings for electrical elements. More specifically, the invention provides an improved housing for process electronics associated with a measuring or sensing device, such as a differential pressure transmitter.

Differential pressure transmitters are commonly used in process control systems that require pressure, flowrate, or measurements of other variables associated with gases and liquids. One typical prior differential pressure transmitter employs a two-section housing assembly. A lower section of the transmitter assembly communicates with an upper section of the transmitter assembly by way of a port extending between the two sections.

The lower section typically houses, among other components, two process diaphragms and a transducer. The lower section includes two process fluid ports for coupling to input process lines for exposing each process diaphragm to one of two fluid pressures that are to be compared. Each process diaphragm deflects in response to the pressure of one fluid. The transducer responds to the difference between the two pressures of the process fluids, and produces electrical output signals for indication or control.

The upper section typically houses process electronics, i.e. electronic circuits and electrical components for monitoring and conditioning the electrical output signals from the transducer for transmission to a display meter, and/or for application to a control valve, a computer or another electronic device. In the case where the conditioned signals are to be applied to a computer or other electronic device, they can be coupled out of the second section of the housing assembly, by way of fittings to electrical conduits.

Typical process fluids can be corrosive and/or toxic. Accordingly, the upper section of the housing assembly, which contains the process electronics, is isolated from the process fluids that are coupled to the lower section of the housing assembly. Since the process fluids are only applied to one side of each process diaphragm, the two process diaphragms and lower section of the housing assembly form a chamber that is isolated from the process fluids and is generally filled with an inert fill fluid. Additionally, this chamber leads to a transducer for generating the electrical output signals to the process electronics.

One disadvantage of some prior fluid measuring systems of the foregoing type is that if either process diaphragm fails, the process fluid can displace the inert fill fluid and the corrosives or volatiles may eventually vent throughout the upper section of the housing assembly, destroying the process electronics. Additionally, the process fluids can then vent from the second section through the electrical conduits, by way of the fittings in the housing assembly. This can be especially dangerous if the process fluids are toxic or flammable. Some prior housing assemblies address this problem by providing a barrier wall that divides the second section into two compartments; one containing the port for communicating between the first and second sections of the housing assembly and the other containing the fittings that couple to the electrical conduits.

Nevertheless, these prior systems continue to suffer from several drawbacks. For example, some employ hard-wired electrical penetrators to feed signals through the barrier wall, and consequently suffer from reduced flexibility with regard to allocating circuitry between the two compartments. Others require that an opening through the barrier wall in the second section be either custom cast or custom machined. Still others have reduced access to the circuitry housed in the second section.

Another drawback to some prior systems is that the two chambers that are created by the barrier wall are not environmentally controlled. Since one chamber is in communication with the lower housing section by way of the port, the process electronics and part of the lower housing section are exposed to any humidity present in the chamber. Hence, some prior devices require all of the electronic components in the upper section of the housing assembly to be sealed or coated from ambient moisture, typically by being potted or conformally coated with a moisture barrier. This can be expensive and can complicate access to the components during maintenance and repair.

In most differential pressure transmitters, the upper section of the housing assembly is accessible at two axial ends by way of threaded covers. While these assemblies provide access to the upper section of the housing assembly, they may have significant disadvantages. One such disadvantage arises because the prior art assemblies typically provide only two compartments in the upper section. Thus, if a cover is removed, all of the electronics housed in that compartment are exposed to the outside environment. Hence, operation in a humid environment can, once again, require the circuits contained in the upper section to be sealed from moisture. Another disadvantage is that such covers allow unrestricted access to the electronics. Thus, the instrument can be inadvertently damaged or subjected to tampering.

It is accordingly an object of this invention to provide an improved housing assembly for process electronics that precludes process fluids from venting into the electrical conduits, upon a failure of one or both process diaphragms.

Another object is to provide a housing assembly that provides improved flexibility with regard to arranging process electronics in the housing, while still ensuring that process fluids are blocked from the electrical conduits.

It is also an object of the invention to provide an improved housing assembly that can contain various types of process electronics, without modifications to the housing.

A further object of the invention is to provide a housing assembly that has improved access, and yet is tamper-resistant.

An additional object of the invention is to provide a housing assembly that minimizes environmentally infiltration while eliminating the need for seal-coating the process electronics, by potting or otherwise.

Yet another object of the invention is to provide a housing structure that has relatively few parts and is relatively economical to manufacture, and that can house a variety of processing electronics, for varied commercial applications.

Other objects of the invention will in part be obvious and will in part appear hereinafter.

SUMMARY OF THE INVENTION

The invention attains these and other objects by providing, in one embodiment, a selectively pressured housing apparatus for electrical elements. The housing apparatus has a body, a wall member, an aperture, and a mounting seat. The body has a chamber therein extending along a first axis, is open at a first axial end and at a second axial end, and has a port extending along a second axis transverse to the first axis. The port communicates with the chamber. The wall member is inside of the body and extends transverse to the first axis and parallel to the second axis and divides the chamber into first and second compartments, which are axially spaced along the first axis. The port communicating with the chamber is in the second compartment. The aperture extends through the wall member and communicates between the first and second compartments. The mounting seat is on the wall member and extends circumferentially about the aperture for removably and replaceably seating an electro-mechanical element with a selected pressure seal to the wall member. According to one preferred embodiment, the first and second compartments house process electronics associated with a differential pressure transmitter. Accordingly, the port for communicating with the chamber can mount to a second housing structure that contains process diaphragms, a pressure transducer, and other components for coupling electrical signals indicative of a differential pressure to the process electronics.

According to a further feature of the invention, the mounting seat projects axially along the first axis into the first compartment from the wall member. A channel extends circumferentially around the mounting seat and has a depth extending along the first axis. The channel, can store a service loop of electrical wire, which can be connected, for example, to the electro-mechanical element seated to the mounting seat.

The mounting seat can have a variety of configurations. According to one embodiment, the mounting seat includes a planar surface facing along the first axis into the first compartment for removably and replaceably seating the electro-mechanical element, with a selected pressure seal, to the planar surface. In another embodiment, the mounting seat has a finished surface, such as a tubular surface, extending axially along said first axis. In one preferred cónstruction, the electromechanical element is mounted to the mounting seat by way of the first compartment, and when mounted, is disposed in the first compartment. The mounting seat can further include fastening threads for the removable and replaceable mounting of the electro-mechanical element. According to one configuration, the fastening threads are formed in a plurality of mounting holes axially extending into the mounting seat. Alternatively, the fastening threads can be formed on a plurality of mounting studs, axially projecting from the mounting seat.

The electronics contained in the housing apparatus typically require maintenance, repair, and calibration. Therefore, according to one embodiment of the invention, at least one axial end of the housing body is threaded for removable and replaceable assembly with an end-cap for selectively closing that end of the body. In apparatus including such an end-cap, it may be desirable to regulate access. Consequently, according to a further feature, the invention provides a tamper-resistant construction in which the threaded end-cap has a substantially cylindrical outer surface, with radial recesses therein spaced circumferentially about the outer surface. The apparatus further includes a stem threadably mounted on the housing body. The stem has a radially large portion that selectively engages in one radial recess of the end-cap for precluding rotation of the end-cap relative to the body. The stem is mounted in a threaded aperture located adjacent to the end of the body that mounts the end-cap. The threaded aperture extends axially into the housing body along an axis parallel to the first axis. The stem can mount in the threaded apeme so that the radially large portion of the stem protrudes from the threaded aperture and selectively seats in a radial recess in the end-cap. The threaded aperture can also include a passage extending therethrough for receiving a filament to engage a flatted portion of the stem to preclude threading the stem, and thereby to lock it in place. According to a further embodiment, the filament can be fastened to preclude removal, thereby, limiting access to the electronic circuitry within the housing.

According to a further embodiment of the invention, the port of the housing apparatus includes a collar on the body and extending along the second axis. The collar has a through passage for communication with the second compartment, and has a tubular outer surface for seating a label. The collar has a radial projection for fixing the rotational position of the label.

Housing apparatus according to the invention can include an electrical terminal-block fitting removable and replaceable relative to the first compartment, by way of the first open end. The terminal-block fitting has a mounting portion for removably and replaceably seating with the mounting seat, for selectively mounting the fittingrelative to the wall member with a selected pressure seal between the first and second compartments. The terminal-block fitting can include a selected set of first electrical terminals arranged for removable and replaceable connection from the first compartment when the terminal-block fitting is mounted to the wall member. According to a further feature, the terminal-block fitting includes a selected set of second electrical terminals in electrical circuit communication with the first electrical terminals and arranged for removable and replaceable connection from the second compartment, when the fitting is mounted to the wall member. In one preferred embodiment, the electrical terminal-block fitting includes a terminal block and a printed circuit board. The printed circuit board has first and second opposed sides, and the first side mounts to the terminal block. The circuit board carries the set of second electrical terminals accessible for removable and replaceable connection from the second compartment, by way of the aperture in the wall, when installed.

According to another aspect of the invention, the second compartment can be further subdivided. To this end, the second compartment can include a second mounting seat for removably and replaceably mounting a second electro-mechanical element with a selected pressure seal. The mounted second element divides the second compartment into first and second cavities. According to one embodiment, the second element includes a mounting bezel, an electrical display, and at least one printed circuit board. The mounting bezel has first and second opposed sides and a through aperture. The first side includes at least one axial projection located on the periphery of the through aperture. The projection is structured as a finger grip, to facilitate the removal and the installation of the second circuit assembly by way of the second open end. The display, which mounts to the second side of the mounting bezel, is visible from the first side by way of the through aperture.

The printed circuit board of the second electrical element has first and second opposing sides and mounts to the second side of the mounting bezel, with its first side in electrical communication with the display. The second side of the printed circuit board of the second electrical element can include electrical terminals that are adapted for removable and replaceable connection with the selected set of second terminals of the terminal-block fitting.

In a preferred practice of the invention, the selected pressure with which the second electrical element is sealed to the second mounting seat is less than the selected pressure seal formed between the first and second chambers by the electrical terminal-block fitting mounted to the first mounting seat. In this way, in the unlikely event that any process fluid inadvertently vents into the first cavity of the second chamber, created between the terminal block fitting and the second electrical element, it would later vent into the second cavity, rather than venting into the first chamber.

According to an alternate embodiment of the invention, the second electro-mechanical element includes a first circuit assembly that has a mounting bracket and at least one circuit board. The mounting bracket has first and second opposed sides, the first side having at least one axial projection accessible as a finger hold for installation and removal of the first circuit assembly relative the second compartment, by way of the second open end. A plurality of mounting supports project axially from and are spaced along the periphery of the second side. Each mounting support includes one or more lateral slots. A printed circuit board is adapted to interfit with and engage one slot in each of the mounting supports to seat the circuit board in the mounting bracket.

According to a further embodiment of the invention, the housing apparatus can include both versions of the above described electro-mechanical elements, each mounted in the second compartment of the housing chamber. In this way, the second compartment is subdivided into three cavities, each having a selected pressure seal with respect to the others and with respect to the first compartment.

The invention accordingly comprises the features of construction, combinations and arrangements of parts exemplified in the constructions hereinafter set forth, and includes the several steps in relation to one or more other such steps for attaining such constructions and combinations of elements, as exemplified in the apparatus and the methods hereinafter disclosed, and the scope of the invention is indicated in the claims.

BRIEF DESCRIPTION OF THE DRAWINGS

For a fuller understanding of the nature and objects of the invention, reference is made to the following detailed description and the accompanying drawing, in which.

DESCRIPTION OF THE ILLUSTRATED EMBODIMENT

The present invention is directed to selectively pressured housing apparatus that contain, for example, the process control electronics for a differential pressure transmitter. Typically, as in the illustrative embodiment described below, an upper housing according to the invention couples to a second lower housing containing, among other components, a pair of process diaphragms and a pressure transducer. Each process diaphragm is exposed to one of two fluid pressures that are to be compared, and deflects in response to the pressure of that fluid. The transducer responds to the difference between the two pressures of the process fluids, and produces an electrical output signal that typically is used for controlling fluid flow in process conduits. The electrical output signal can be coupled to the process control electronics by way of a port extending between the two housings. A lower housing adapted for coupling to an upper housing according to the invention, is described in further detail in U.S. patent application Ser. No. 08/294,090, filed in Aug. 22, 1994, assigned to the assignee of the present application, and incorporated by reference herein.

Housing apparatus according to the invention can further include one or more fittings connected to electrical conduits for coupling processed signals, from the process control electronics, to other electronic equipment, such as process controlling computers located in remote control areas.

The housing apparatus of the invention provide several improvements over the prior art. According to one feature, the invention provides a housing assembly having multiple selectively pressure sealed chambers. As detailed below, such selectively sealed chambers ensure that process fluids do not inadvertently vent into the electrical conduits, and improve environmental protection of sensitive transmitter electronics. The invention, according to another feature, provides a standard housing that can accommodate a variety of customized circuit modules to provide any of multiple functions at relatively low manufacturing and inventory costs. Additionally, the invention provides improved access to the circuit modules contained in the housing, and controls access to the housing by way of a tamper-proof mechanism. These and other features of the invention are detailed below.

Figure 1A:
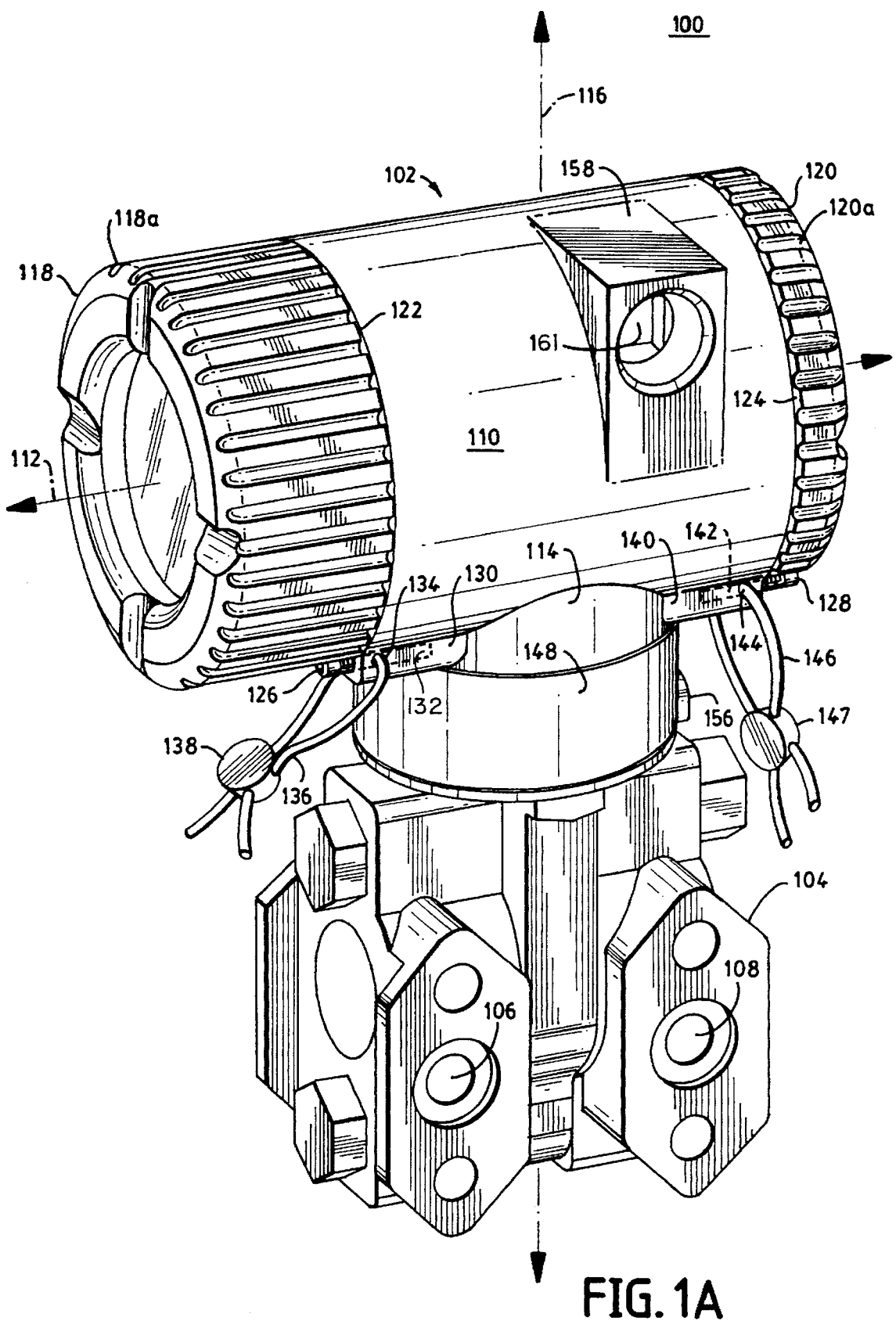
FIG. 1A is a perspective view of a differential pressure transmitter including a selectively pressured housing apparatus according to the invention.

FIG. 1A shows an external perspective view of a differential pressure transmitter 100, including a selectively pressure sealed housing assembly 102 according to the invention. As shown, the illustrated upper housing assembly 102 is mounted on a second or lower housing 104, which contains, among other components, a pair of process diaphragms and a pressure transducer. Two process fluids, whose pressures are to be compared, couple to the housing 104 and to the process diaphragms therein by way of fittings 106 and 108.

The housing assembly 102 includes a housing body 110 elongated along a fixst axis 112 and having a collar 114 extending along a second axis 116 transverse to the first axis 112. The body 110 has a hollow inner chamber. To provide access to the inner chamber of the body 110, the housing assembly 102 has removable and replaceable end-caps 118 and 120, threadably mounted to axially opposed open ends 122 and 124. Each end-cap 118 and 120 has a substantially cylindrical outer surface that is recessed with axially extending groove-like recesses 118a and 120a. The recesses are spaced circumferentially about the outer surface of each end-cap 118 and 120, to form radially-projecting flutes on each end-cap. Any recess 118a on the end-cap 118 can selectively engage a stem 126 to preclude rotation of the end-cap 118, with respect to the housing body 110. Similarly, any recess 120a can selectively engage a stem 128 to preclude rotation of the end-cap 120, with respect to the housing body 110.

Figure 1C:
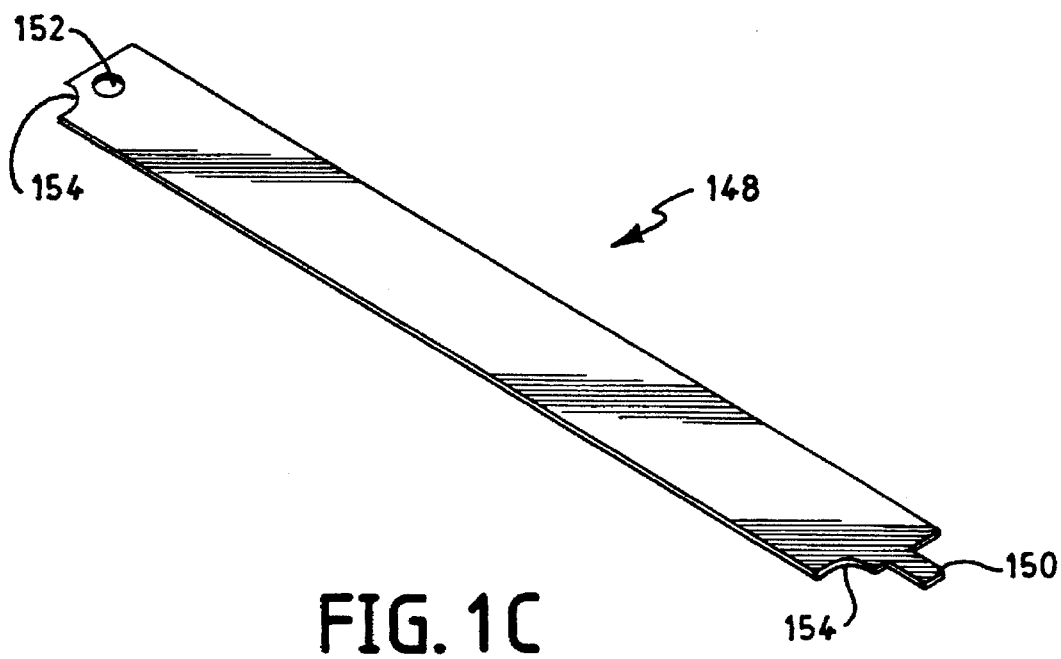
FIG. 1C is a perspective view of a label of the type employed in the apparatus of FIG. 1 A.
Figure 1B:
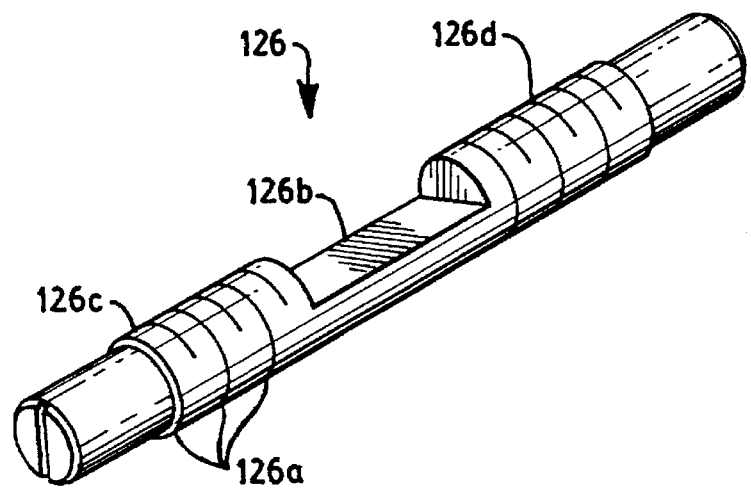
FIG. 1B is a perspective view of a locking stem of the type employed in FIG. 1A to preclude rotation an end-cap.

The illustrated stem 126, as shown in FIG. 1B, is structured as a cylindrical machine screw with threads 126a, and has a flatted portion 126b axially intermediate cylindrical portions 126c and 126d. The illustrated flatted portion 126b is generally cylindrical, in transverse cross section, with a recess along a chord.

Referring again to FIG. 1A, the housing body 110 includes a boss 130 having a threaded aperture 132, which extends parallel to the first axis 112. To lock the end-cap 118 onto the body 110, to preclude access, the threaded stem 126 seats in the correspondingly threaded aperture 132, with the portion 126c protruding axially from the aperture 132 to seat in a recess 118a. As shown, the flatted portion 120b and other cylindrical portion 126d seat within the threaded aperture 132. The housing body 110 is apertured at the boss 130 with a hole 134 that passes through the threaded aperture 132. The hole 134 is located along the portion of the aperture 132 that seats the flatted portion 126b of the stem 126. A filament 136, such as a lock wire, passes through the hole 134 and engages the flatted portion 126b to preclude rotation and removal of the stem 126. The lock wire 136 can be fastened with a deformable clasp 138 to preclude inadvertent removal, thereby rendering the end-cap 118 relatively tamper-proof, unless the wire is cut. With the wire 136 removed, the stem 126 can be rotated and removed from the body, or can be threaded further into the aperture 132 to be clear of the end-cap flutes, to allow the end-cap 118 to be rotatably removed from the body 110.

The stem 128, at the other end of the housing body, is constructed in the same fashion as the stem 126. Accordingly, the illustrated housing body 110 includes another boss 140 having an axially extending threaded aperture 142. The stem 128 threadably seats in the aperture 142 and includes a protruding portion that selectively engages and seats in a recess 120a in the end-cap 120. A hole 144 passes through the aperture 142 to accommodate a lock wire 146, which engages a flatted portion of the stem 128 to preclude inadvertent removal thereof. Once again, a deformable clasp 147 fastens the wire 146 to precludes its unwanted removal.

Figure 2:
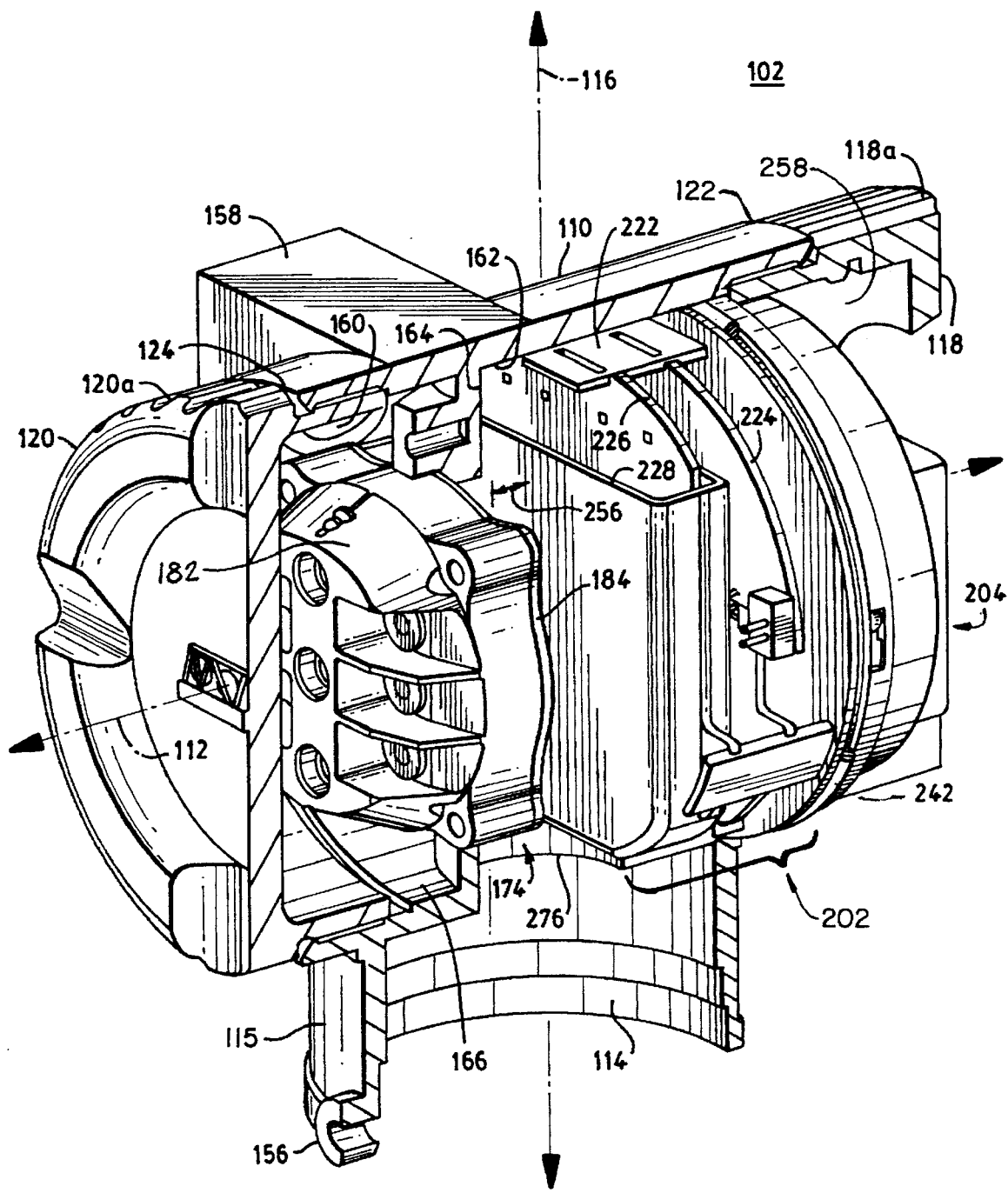
FIG. 2 shows a rear perspective partially cut away view of the selectively pressured housing apparatus of FIG. 1A.

With reference to FIGS. 1A, 1C, and 2, the housing assembly 102 has a label 148 mounted circumferentially around a recessed outer surface 115 of the collar 114. The label 148, shown in FIG. 1C, includes a fastening tab 150, which upon installation of the label on the collar 114, fits within a fastening aperture 152, and is folded back to lock the label 148 onto the collar. Additionally, the label 148 includes a notch or detent 154, which is formed when the label 148 is fastened. The detent 154 interlocks with a radial projection 156 on the collar 114 to fix the rotational position of the label 148 on the collar 114. Thus, the detent 154, in combination with the radial projection 156, provides a mechanism by which the legend on the label can be selectively oriented on the collar, without rivets or piercing the housing.

With further reference to FIG. 2, the illustrated body 110 of the housing apparatus 102 has a boss 158 having a through fitting 160 that communicates through the tubular wall of the body to the chamber. The fitting 160 can connect, with a conventional structure, by means of an electrical conduit (not shown) to couple electrical signals from the electronics within the housing body 110 to, for example, a remote control room. The fitting 160 is typical of others that can be provided on the body 110; see for example the further boss 159 and fitting 161, illustrated in FIG. 3.

Figure 3:
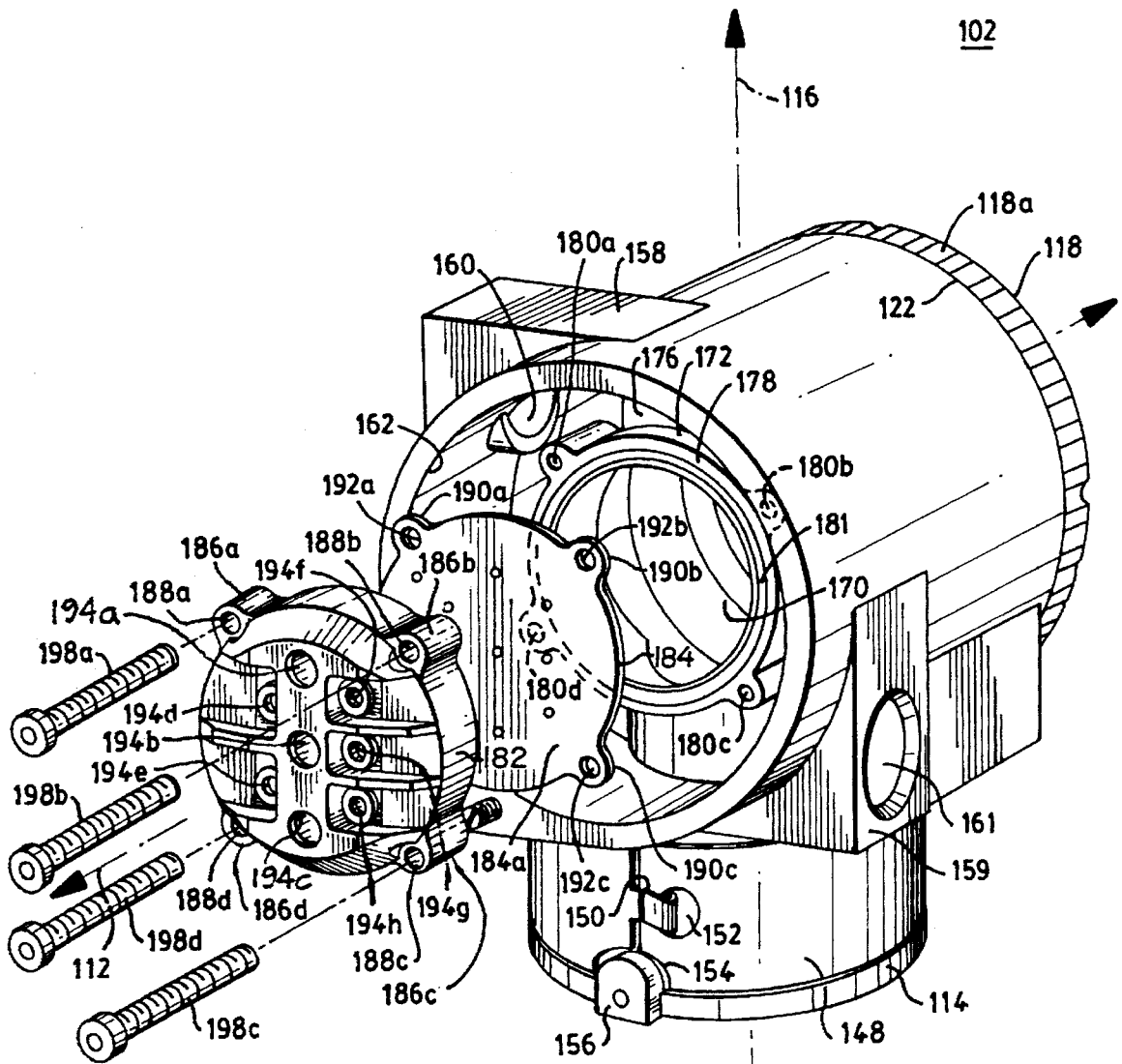
FIG. 3 is a rear perspective exploded view of the selectively pressured housing apparatus of FIG. 1A.

With reference to FIGS. 2 and 3, the housing body 110 has a tubular wall 162 that in part defines the chamber therein. A wall member 164 extends radially inward from the tubular wall 162. It is oriented transverse to the first axis 112 and parallel to the second axis 116. The wall member 164 divides the hollow chamber into a user termination compartment 166 and an electronics and display compartment 168; the compartments being adjacent along the first axis 112. An aperme 170 extends through the wall member 164 and hence communicates between the two compartments. The aperture 170 has a mounting seat 172 circumferentially disposed about it for removably and replaceably seating an electromechanical terminal block fitting 174, with a pressure seal or deformable O-ring, to the wall member 164. According to a preferred embodiment of the invention, the electromechanical terminal-block fitting 174 is removable and replaceable from the first compartment 166, by way of the first open end 124.

As depicted in FIG. 3, the illustrated mounting seat 172 projects axially along the first axis 112 into the user termination comparUnent 166 from the wall member 164 to form an annular channel 176 between the axially projecting portion of the mounting seat 172 and the tubular inner wall 162. The channel 176 extends circumferentially around the mounting seat 172 and provides a storage area for electrical wires coupling signals out of the user termination compartment 166 by way of fittings 160 and/or 161.

The illustrated mounting seat 172 includes a planar surface 178, which faces along axis 112 into the first compartment 166. The planar surface 178 is axially recessed with an O-ring groove 181. A deformable O-ring which seats in groove 181 aids in achieving a pressure seal between the terminal-block fitting 174 and the mounting seat 172. The mounting seat 172 further includes tapped holes 180a–180d for removably and replaceably fastening the electromechanical terminal-block fitting 174 to the mounting seat 172 with bolts 198a–198d.

Figure 4:
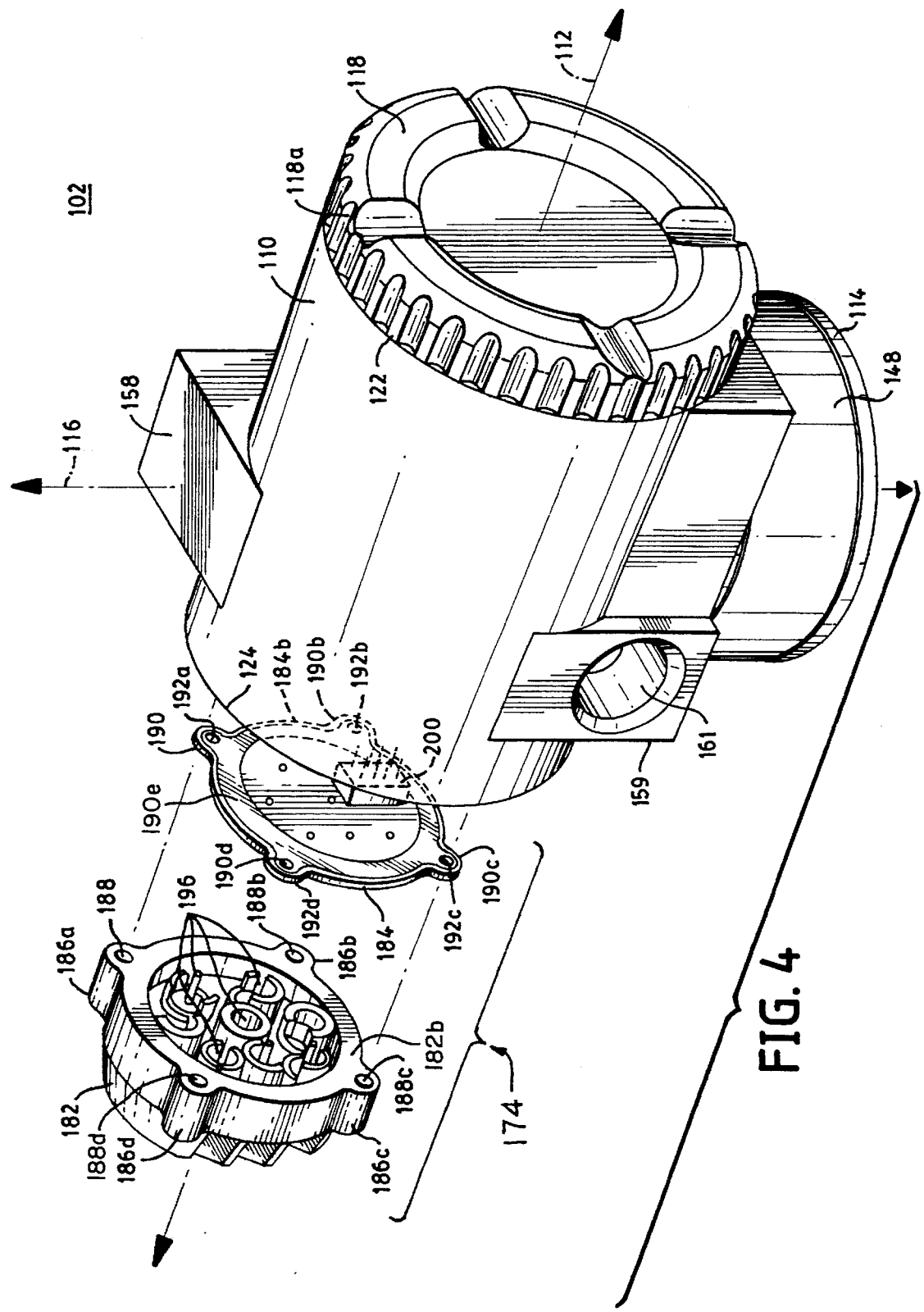
FIG. 4 is a front perspective view, partially exploded, of the selectively pressured housing apparatus of FIG. 1A.

With reference to FIG. 4, the terminal-block fitting 174 includes a terminal block 182 and a two-sided printed circuit board 184. The terminal block 182 has a mounting portion with radial projections 186a–186d, each having a corresponding through holes 188a–188d. Similarly, the printed circuit board 184 has a mounting portion with radial projections 190a–190d, each also having corresponding through apertures 192a–192d. A first side 182a of the terminal block 182 includes a set of electrical terminals 194a–194h (FIG. 3) for removable and replaceable connection from the user termination compartment 166 and from conduit fittings 160 and 161. The terminals 194a–194h electrically couple from the first side 182a of the terminal block 182 to a corresponding set of solderable terminals 196 on the opposed second side 182b of the terminal block 182.

During assembly, the through holes 188a–188d of the terminal block 182 are aligned with the through apertures 192a–192d of the circuit board 184, and the first side 184a of the printed circuit board 184 is affixed to and seated flush with the second side 182b of the terminal block 182. Electrical conductors on the circuit board are electrically coupled to the terminals 194a–194h by way of the solderable terminals 196. The terminals are soldered to the board in a manner that closes any pre-existing through holes in order that the board forms a seal barrier. In addition, terminals 194a–194h are blind holes so that the terminal block 182 also forms a seal. Once the circuit board 184 is assembled with the terminal block 182, the terminal-block fitting 174 (FIGS. 2 and 5), which this assembly forms, can be secured to the mounting fitting 172. An annular solder coated section 190e forms a seal seat for the O-ring positioned in groove 181. According to a preferred embodiment, each through aperture 188a–188d and 192a–192d axially aligns with a corresponding tapped mounting hole 180a–180d, and the terminal-block fitting 174 is secured in place by mounting bolts 198a–198d. When thus seated and secured, the fitting 174 with the mounting seat 172 forms a pressure seal between compartments 166 and 168. One function of this pressure seal is to isolate humidity or fluid present in compartment 166 from entering and damaging electronics in compartment 168, shown in FIG. 6.

As shown in FIG. 4, second side 184b of the circuit board 184 includes a set of electrical terminals 200 for removable and replaceable connection with process control electronics, contained in the electronics and display compartment 168, by way of the aperture 170. The circuit board 184 also includes EMI and RFI protection circuitry. According to one embodiment of the invention, a plurality of different circuit boards 184 and termination blocks 182, each having customized electrical functionality, can be employed interchangeably in the housing apparatus 102. By way of example, circuit board 184 can be adapted to couple various types of conditioned signals to terminals 194a–194h, such as digital signals or analog signals, in either optical or electrical form. Additionally, a variety of terminal blocks 182, each having customized terminal configurations, can be selected for employment in the fitting 174, depending in part on the particular circuitry contained on the circuit board 184. By way of example, the terminals 194a–194f can be adapted as screw-type fittings, coaxial cable connections, fiber optical connections, and/or banana jack type connections. Additionally, those connections may or may not be powered, and can provide digital or analog outputs. However, regardless of the particular features of the selected terminal block 182 or the selected circuit board 184, the terminal-block fitting 174 maintains a consistent sealing function and mechanical outline. Thus, a common housing body 110 can be employed, regardless of the selected features of terminal-block fitting 174, thereby reducing inventory and manufacturing costs.

Figure 5:
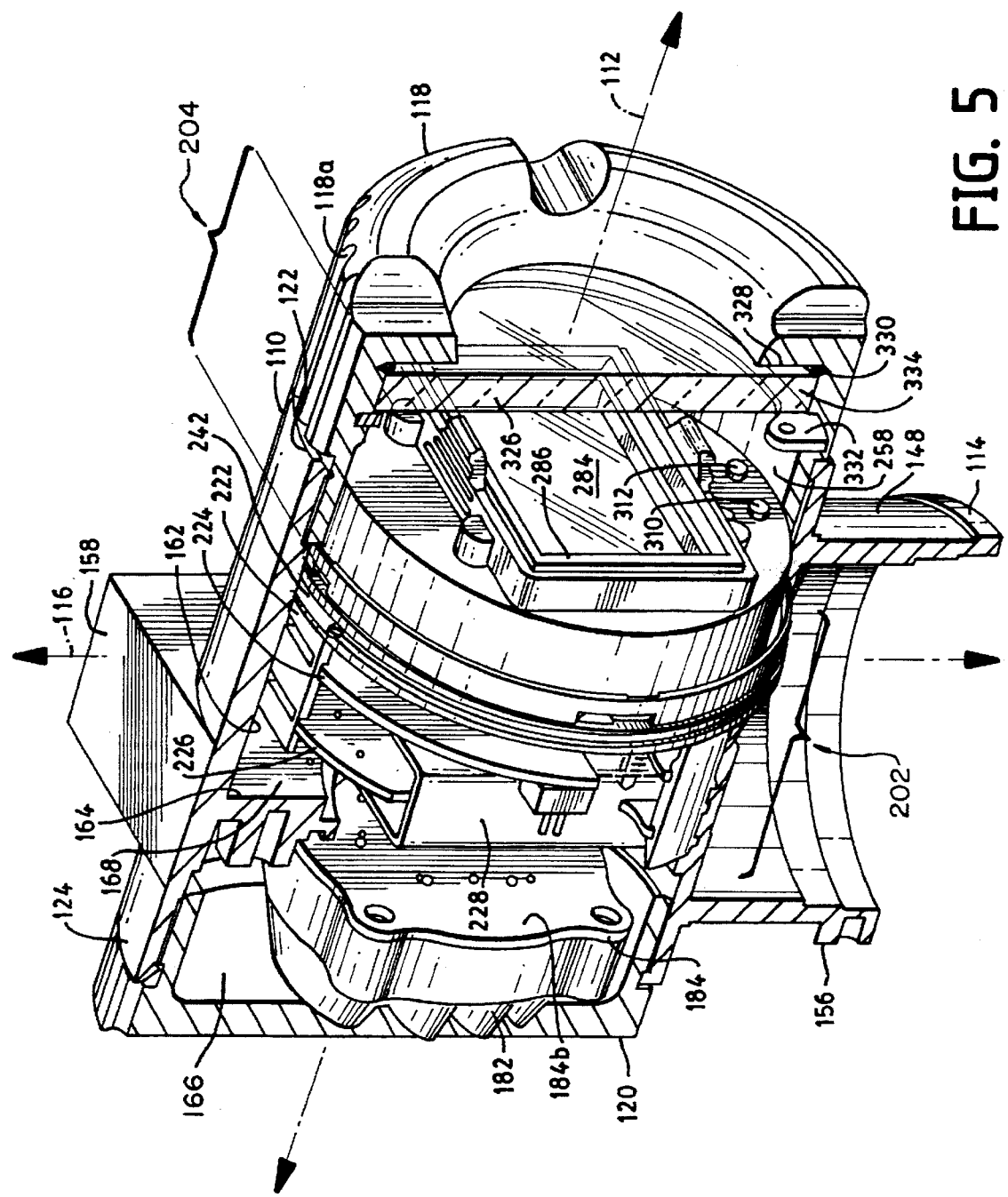
FIG. 5 is a front perspective view, partially broken away, of the selectively pressured housing apparatus of FIG. 1A.
Figure 6:
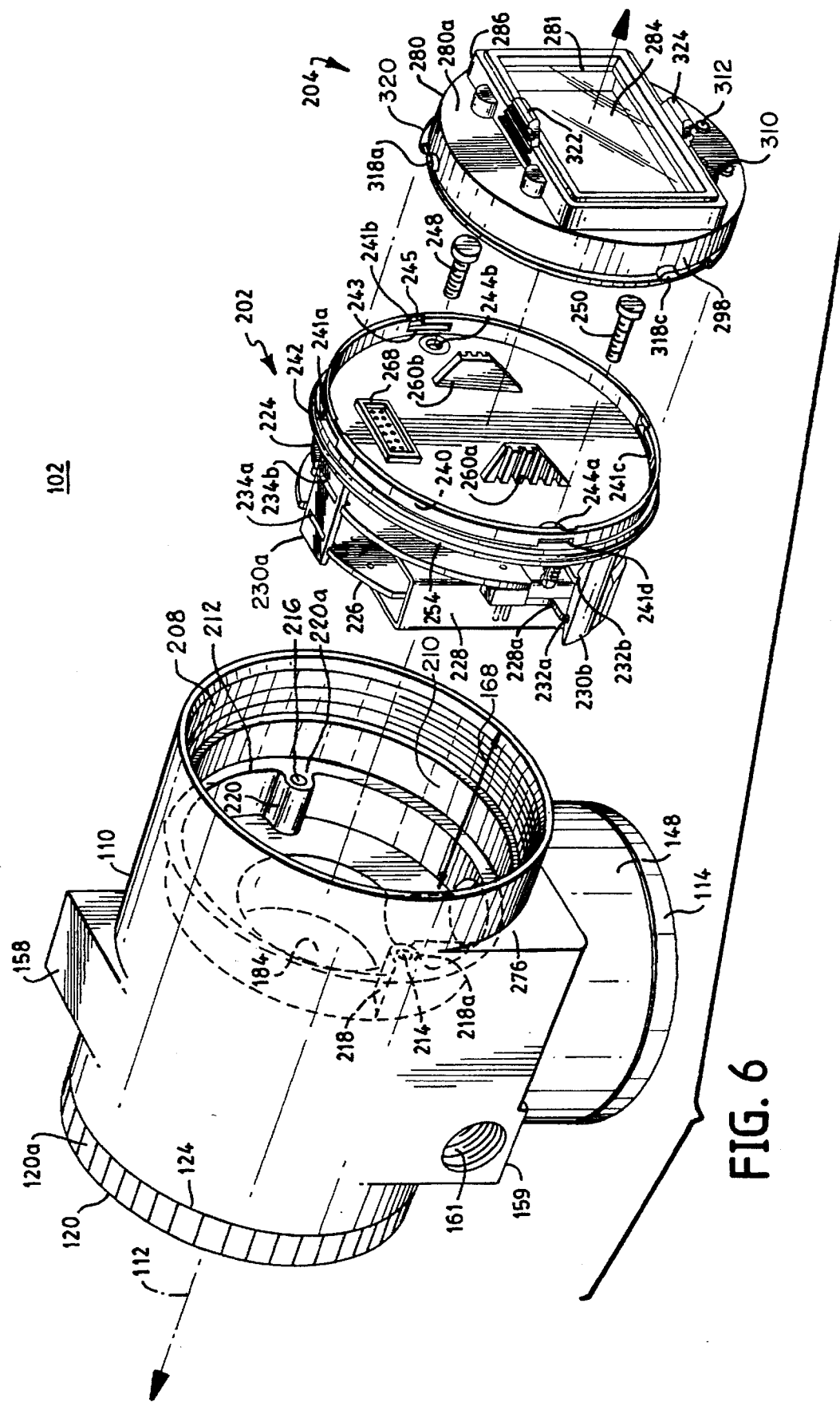
FIG. 6 is a front perspective exploded view of the selectively pressured housing depicted in FIG. 5.

With continued reference to FIG. 2, and additional reference to FIGS. 5 and 6, the electronics and display compartment 168 (FIG. 6) of the housing body 110 is adapted for removably and replaceably seating first and second axially successive circuit modules 202 and 204, respectively, by way of the second open end 122. As shown, the second compartment 168 is partially defined by an tubular wall 162. The wall 162 has a threaded portion 208 (FIG. 6) for threadably engaging the end-cap 118. The electronics and display compartment 168 also has a mounting portion for removably and replaceably mounting the two axially successive circuit modules 202 and 204. The illustrated mounting portion includes a finished, relatively smooth cylindrical section 210, axially adjacent to the threaded portion 208 and extending into compartment 168 along the wall 162. The mounting portion 210 further includes, at its axially innermost terminal end, a small shoulder 212 radially extending inward. Mounting threads, comprising two threaded holes 214 and 216, axially extend into diametrically opposed bosses 218 and 220, which radially extend inward from the wall 162. The bosses 218 and 220 have planer surfaces 218a and 220a, respectively, facing along axis 112 into the compartment 168.

With reference to FIGS. 5 and 6, the first circuit module 202 of the illustrated embodiment has a mounting bracket 222, two circuit boards 224 and 226, and a receptacle 228. The circuit board 226 mounts inside receptacle 228, which can be filled with a potting material to further seal electrical components on the circuit board 226, thus additionally protecting those components from environmental adversities, such as humidity. The mounting bracket 222 removably and replaceably seats the circuit board 224, the circuit board 226, and the receptacle 228. To this end, the mounting bracket 222 is constructed from an electrically insulative, flexible plastic. As shown in detail in FIGS. 7 and 8, the bracket 222 has a first side 222a from which three axial projections 230a–230c, equally spaced around its periphery, extend along an axis normal to that side. Axial projections 230b and –230c each includes two radially inward facing slots 232a and 232b, which seat circuit boards. On one axial projection 230a, through apertures 234a and 234b are used in lieu of slots. A tab 236 on the circuit board 224 matingly interfits with the through aperture 234b, while the edge of the board 224 matingly interfits with the slot 232b on each axial projection 230a–230c. Similarly, aperture 234a matingly receives a tab 238 on the circuit board 226. Radial projections 228a and 228b on the potting receptacle 228 matingly interfit with the slots 232a of axial projections 230b and 230c, respectively. In this way, the bracket 222 secures the circuit boards 224 and 226, and the potting receptacle 228, with a removable and replaceable mounting. If potting is not required, two printed wiring assemblies can, where desired, be accommodated in place of the potting receptacle 228 and circuit board 226.

Figure 7:
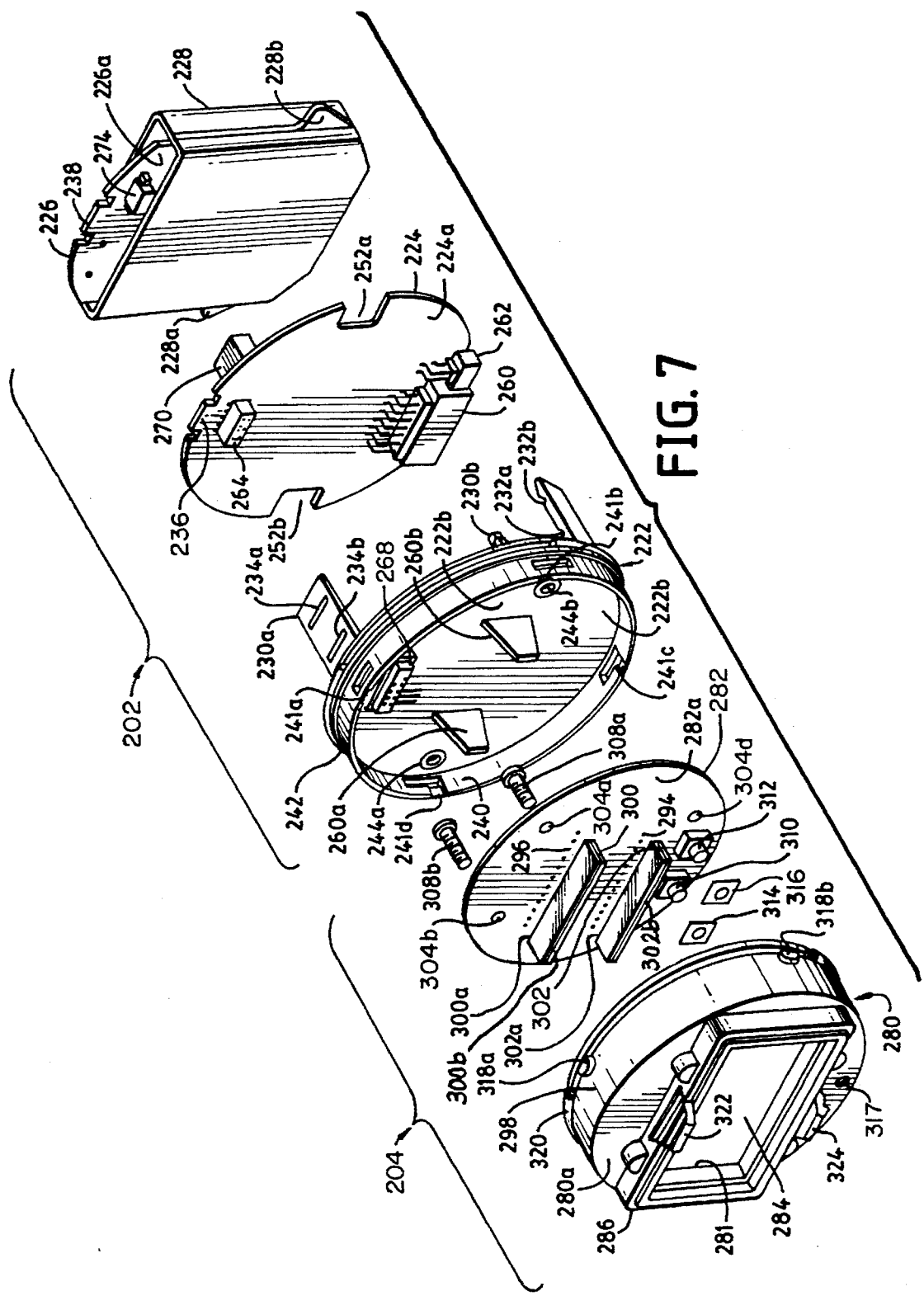
FIG. 7 is an exploded front perspective view of the electronic assemblies of the type depicted in FIG. 6.
Figure 8:
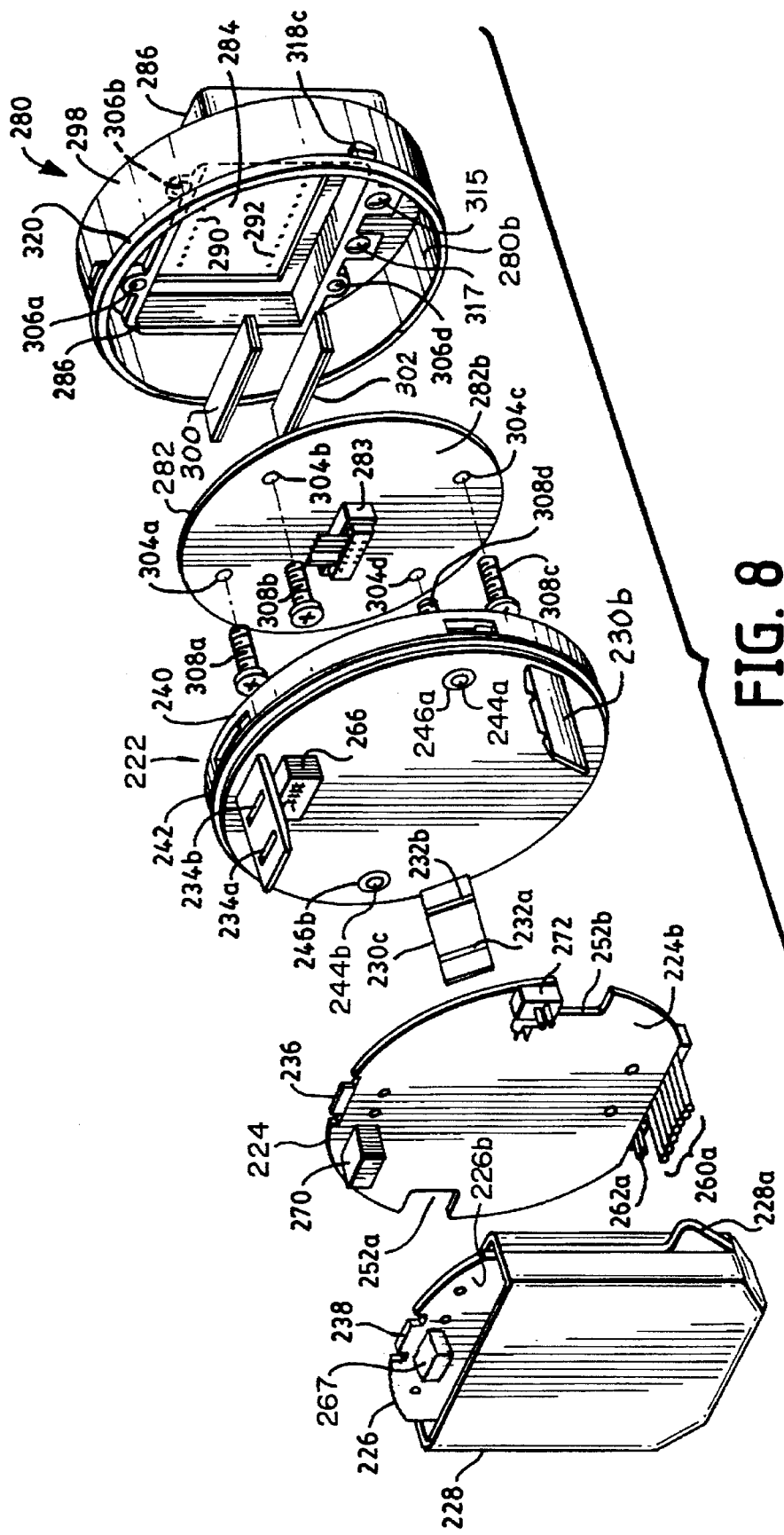
FIG. 8 is an exploded rear perspective view of the electronic assemblies of the type depicted in FIG. 6.

The mounting bracket 222 includes a collar 240 extending circumferentially around and axially from an opposed second side 222b. The collar 240 includes four mounting notches 241a–241d for optionally, matingly mounting the second axially successive circuit module 204. Each mounting notch 241a–241d includes an axially extending portion 243 and a circumferentially extending portion 245, shown in FIG. 6. The outer wall of the collar 240 seats a deformable O-ring 242 circumferentially disposed around it. As shown in FIGS. 6 and 7, the bracket 202 is apertured with two diametrically opposed through holes 244a and 244b. As shown in FIG. 8, the surface 222a has two mounting pads 246a and 246b. Mounting pad 246a is a flat finished surface that is circumferentially disposed about aperture 244a. Similarly, mounting pad 246b is a flat finished surface that is circumferentially disposed about aperture 244b. During installation of the circuit module 202 in the housing body 110, the surface 222b faces toward the open end 122 and is normal to the first axis 112. Each through aperture 244a and 244b axially aligns with one threaded aperture 214 and 216, shown in FIG. 6. The module 202 telescopically interfits into the housing body 110 so that mounting pads 246a and 246b seat flush on the planar surfaces 218a and 220a, respectively. Threaded mounting bolts 248 and 250 pass through the apertures 244a and 244b to engage matingly threaded holes 214 and 216, respectively, to secure the module 202 to the housing body 110. As shown in FIGS. 6 and 7, the circuit board 224 includes notches 252a and 252b to enable the mounting bolts 248 and 250 to pass, unobstructed. By securing the mounting bolts 248 and 250, a pressure seal is formed between planar surface 218a and mounting pad 246a, and between planer surface 220a and mounting pad 246b, forming in combination with O-ring 242 a sealed protected space for electrical circuit boards 224 and 226.

More particularly, as shown in FIG. 5, the O-ring 242 forms a pressure seal with the finished portion 210 oft he tubular wall 162. Thus, the installed element 202 further subdivides the electronics and display compartment 168 into first and second cavities 256 and 258. The first cavity 256 extends axially from the wall member 164 to the O-ring 242, and contains the circuit boards 224 and 226 and the potting receptacle 228. The second cavity 258 extends axially from the O-ring 242 to end 122 of the housing body 110. One advantage of this configuration, is that the end-cap 118 can be removed, without exposing the electronics of the module 202 to any adverse environmental conditions, such as, humidity. Therefore, optionally, one or both of the circuit boards 224 and 226 can be constructed without additional moisture-sealing material to protect the circuitry contained on those boards.

When installed in the compartment 168, due to the above discussed selected pressure seals, the circuit module 202 can be difficult to remove due to seal suction. Thus, as shown in FIG. 6, according to another feature of the invention, the surface 222b of bracket 222 includes two ribbed axial projections 260a and 260b for a technician to grasp onto, when removing module 202 from compartment 168. These projections provide opposed and spaced-apart surfaces for manual engagement from the open end 122 of the housing body 110. However, under certain atmospheric conditions, a vacuum can develop in the first cavity 256, relative to the second cavity 258. If such a vacuum forms, even the finger grips 260a and 260b can prove insufficient to remove the module 202. Therefore, according to a preferred embodiment of the invention, upon loosening the mounting bolts 248 and 250, the pressure seal between the planar surfaces 218a and 220a and the mounting pads 246a and 246b is broken, thereby, releasing any vacuum so formed.

As shown in FIGS. 2 and 6, a port 276, through which electrical connection can be made to a pressure transducer, communicates with the first cavity 256 of the electronics and display compartment 168. In the event of a failure of one of the process diaphragms associated with the pressure transducer, process fluids may after an extended period of time vent into the cavity 256, shown in FIG. 2. As previously discussed, it can be dangerous for process fluids to mix with the inert fill fluid and eventually cause corrosion that might permit gas to vent into electrical conduits by way of fittings 160 and 161. Thus, according to one feature of the invention, the pressure seal between cavities 256 and 258 is selected to be substantially less than the pressure seal between the terminal-block fitting 174 and the mounting seat 172. By way of example, according to a preferred embodiment, the seal between the terminal-block fitting 174 and the mounting seat 172 can withstand pressures of upwards of 800 psi, while the seal between cavity 256 and cavity 258 can only withstand pressures of about 3–5 psi.

Further, the seal, formed by end cap 118, between cavity 258 and the external atmosphere, can only withstand pressures of approximately 400 psi. Consequently, any such gases which vent into cavities 256 and 258 would vent to the atmosphere, rather than entering the conduits. Thus, if process fluid inadvertently vents into the first cavity 256, the fluid vents into the second cavity 258, and then to atmosphere and does not rupture the seal between the terminal-block fitting 174 and the mounting seat 172.

Turning to the electrical interconnections associated with circuit module 202, as shown in FIGS. 7 and 8, the circuit boards 224 and 226, and the bracket 222 which mounts them, have a plurality of electrical terminals for removable and replaceable connection. By way of example, the circuit board 224 has a first electrical connector 260 on the side 224a and has a set of associated electrical terminals 260a that axially project from the opposite side 224b. The circuit board 224 has a second electrical connector 262, mounted adjacent to connector 260 on side 224a, that also has a set of associated electrical terminals 262a that axially project from side 224b. The terminals 260a and 262a are adapted for removable and replaceable electrical connection to other electrical devices, namely to a differential pressure transducer in the illustrated embodiment. The circuit board 224 further includes a third connector 264 mounted on side 224a. The connector 264 removably and replaceably connects directly to a connector 266, which is mounted on side 222a of the bracket 222. The connector 264 couples electrical signals through the bracket 222 to a connector 268 mounted on the bracket side 222b. The circuit board 224 has two additional electrical connectors 270 and 272 mounted on side 224b. The connector 270 is adapted for removable and replaceable direct connection to a mating electrical connector 274 on side 226a of the circuit board 226. The connector 272 is adapted for a removable and replaceable ribbon wire (not shown) connection to a reed switch connection positioned in the port chamber of the housing assembly 276 (FIG. 2).

With respect to the electrical functionality of the circuit module 202, according to one embodiment of the invention, the circuit board 224 performs signal processing, while the circuit board 226 provides power to the circuit board 224. More specifically, the illustrated circuit board 224 receives electrical signals, which are indicative of a pressure difference between two process fluids, from a pressure transducer by way of the terminals 260a and 262a. The circuit board 224 performs an analog-to-digital conversion on the received signals. It then digitally processes the converted signals to compensate for nonlinearity and temperature-related errors in the signals from the pressure transducer. The circuit board 224 formats the processed signals for digital transmission, and couples those digital signals to board 226 by way of connectors 270 and 274. Board 226 in tam couples the signals to the electrical terminal-block fitting 174, by way of a connector 267 on side 226b of the circuit board 226 and the terminals 200 on the terminal-block fitting 174. The circuit board 224 can also couple the processed digital signals into the cavity 258, by way of the connectors 264 on the circuit board 224 and the connectors 266 and 268 on the bracket 222. The circuit board 226 also performs a digital-to-analog conversion on the processed signals, and provides the processed signals, in analog form, to the electrical terminal-block fitting 174.

According to a further feature of the invention, the sealed housing electronics assembly 102, shown in FIGS. 1A and 5, includes an electrical display module 204 that operates in conjunction with the circuit module 202. As shown in FIGS. 7 and 8, the illustrated display module 204 has a bracket 280, a circuit board 282, and a display element 284. The display bracket 280 is shaped generally like a circular lid and has opposed sides 280a and 280b, with a rectangular aperture 281 therebetween. A rectangular bezel-like frame 286 extends around the periphery of the rectangular apeme 281 and projects axially from both side 280a and 280b.

The display element 284, which can, for example, be a liquid crystal display, seats in the aperture 281 within the bezel-like frame 286, and is readable from side 280a by way of the rectangular aperture 281. As shown in FIG. 8, the display element 284 includes two horizontally extending rows 290 and 292 of electrical contacts. Each row of electrical contacts 290 and 292 provides addressable interconnections to a plurality of display segments in the display element 284. As shown in FIG. 7, the side 282a of the circuit board 282 has two rows 294 and 296 of correspondingly arranged electrical contacts for coupling electrical control signals to the display element 284 by way of the rows 290 and 292 of contacts, respectively.

The display bracket 280 has a peripheral rim-like collar 298 extending axially from and circumferentially around the surface 280b. The circuit board 282 seats within the collar 298. Flexible conductors 300 and 302, shown in FIG. 7, mount between side 282a of the circuit board 282 and the display element 284. Each flexible conductor 300 and 302 has a plurality of electrically conductive filaments passing through it between its opposed sides 300a and 300b, and 302a and 302b, respectively. When assembled, the flexible conductors 300 and 302 matingly sandwich between side 282a of the circuit board 282 and the display element 284. The side 300a of the flexible conductor 300 couples to the contact row 296 of the circuit board 282. Similarly, the side 300b couples to the contact row 290 of the display 284. In this way, the flexible conductors couple electrical control signals between the rows of contacts on the circuit board 282 and the rows of contacts on the display element 284.

The illustrated circuit board 282 has four through apertures 304a–304d for mounting to the display bracket 280. During assembly, the through apertures 304a–304d axially align with axially extending threaded mounting apertures 306a–306d in the bezel-like frame 288. Mounting screws 308a–308d engage the threaded apertures 306a–306d to fasten the circuit board 282 in place to compress the flexible conductors to ensure secure and reliable electrical connection between the circuit board 282 and the display element 284.

As also shown in FIGS. 7 and 8, the circuit board 282 has two push button switches 310 and 312 mounted on side 282a. The two push button switches 310 and 312 couple through apertures 315 and 317, respectively, in the bracket 280 and are accessible from the end 122 of housing 110. Gaskets 314 and 316 provides a pressure seal between the push button switches 310 and 312 and the frame 288. The circuit board 282 further includes an electrical connector 283 for removably and replaceably connecting with a feedthrough connector 268 on the bracket 222 of the circuit module 202.

As shown in FIG. 6, the collar 298 of the display bracket 280 includes four circumferentially equally-spaced radial projections 318a–318d, for mounting the display module 204 to notches in the collar 240 of bracket 222. During assembly, each radial projection 318a–318d interfits with an axially extending notch portion 245, shown in FIG. 6, of a corresponding mounting notch 241a–241d. The element 204 can then be rotated clockwise so that each radial projection 318a–318d engages a circumferentially extending portion 243 of the corresponding mounting notch 241a–241d. In this way, the display module 204 mounts, removably and replaceably, to and interlocks with circuit module 202. The display module 204 can mount in any one of four rotational orientations with respect to the element 202 so that display element 284 is readable, regardless of the rotational orientation of the housing body 110. This is possible since circuit board assembly 204 is connected to circuit assembly 202 by a flexible ribbon connector (not shown).

The collar 298 of the display bracket seats a deformable O-ring 320 circumferentially disposed there around. When display module 204 mounts to circuit module 202, the collar 298 telescopically fits into the collar 240, with O-ring 320 forming a pressure seal with the inner wall of collar 240. The seal, thus formed, environmentally isolates the electronics of circuit module 202 and display module 204. Consequently, the end-cap 118 can be removed and the push buttons 310 and 312 accessed, without exposing any circuitry contained in that compartment to adverse environmental conditions, such as excessive moisture.

Since the display module 204 is seated with a selected pressure seal to the circuit module 202, it can be difficult to remove. However, according to a further feature of the invention, two ribbed manually-engageable tabs 322 and 324 axially project from the surface 280a for a technician to grasp when removing, and when installing, the display module 204.

In the foregoing embodiment, where the display module 204 is employed with the circuit module 202, the latter module preferably includes a power supply and signal processing circuitry, previously discussed, and the circuit board 282 of the display module 204 contains circuitry for controlling and interfacing with the display element 284, and with the push button switches 314 and 316. In applications that do not require both modules, the display module 204 is used alone. The circuit board 282 then additionally includes the signal processing and the power supply circuitry, in lieu of the circuit boards 224 and 226. According to this alternative embodiment, the display module 204 can, nevertheless, utilize a bracket of similar construction to the circuit-board bracket 240 to provide selected rotational orientations. However, in that case, the circuit-board bracket need not include structures, such as the axial projections 230a–230c, for mounting additional circuit boards. According to one practice where the display module 204 is used without the circuit module, the circuitry for providing processed signals to the terminal-block fitting 184 in digital format is omitted. In this way, the invention provides a plurality of interchangeable circuit modules and display modules, which can be utilized in a plurality of combinations to provide a variety of selectable electrical features.

Regardless of whether the display module 204 is employed separately or in conjunction with the circuit module 202, the push button switches 310 and 312 operate in essentially the same manner to enable a technician to perform various diagnostic and/or calibration functions. By way of example, among other functions, these switches can enable a technician to calibrate the electrical elements and the pressure transducer with regard to a pressure reference; alternate functions are to zero the system, initialize the electronics, and to adjust the pressure span over which the display element 284 operates.

As shown in FIG. 5, the end cap 118 is constructed with a transparent window 326 for providing visual access to the display element 284. The window 326 is seated with a selected radial pressure seal to a shoulder 328 on the end cap 118, by way of a deformable O-ring 330. A ring clamp 332 is compressed into a slot 334 to fasten the glass in place, with the selected pressure seal.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all generic and specific features of the invention described herein, and all statements of the scope of the invention which as a matter of language might be said to fall there between.

Having described the invention, what is claimed as new and secured by Letters Patent is:

1. Selectively pressure sealed housing apparatus for electrical elements, said housing apparatus comprising
   A. a body having a chamber therein extending along a first axis, said body being open at a first axial end and a second axial end, and having a port extending along a second axis transverse to said first axis, said port communicating with said chamber,
   B. a wall member inside said body extending transverse to said first axis and parallel to said second axis and dividing said chamber into first and second compartments axially spaced along said first axis, said port communicating with said chamber at said second compartment,
   C. an aperture extending through said wall member and connecting said first and second compartments, and
   D. a mounting seat on said wall member and extending circumferentially about said aperture for removably and replaceably seating an electro-mechanical fitting with a first pressure seal to said wall member.

2. Housing apparatus according to claim 1 in which said mounting seat projects axially along said first axis into said first compartment from said wall member and forms, in said first compartment, a channel having a depth extending along said first axis and extending circumferentially around said mounting seat.

3. Housing apparatus according to claim 1 further comprising means forming, in said first compartment, a wire-receiving channel having a depth extending along said first axis and extending circumferentially around said chamber.

4. Housing apparatus according to claim 1 in which said mounting seat includes a planar surface facing along said first axis into said first compartment for removably and replaceably seating said element with said first pressure seal to said planar surface.

5. Housing apparatus according to claim 1 in which said mounting seat includes a finished surface for removably and replaceably seating said element with said first pressure seal to said finished surface.

6. Housing apparatus according to claim 5 in which said mounting seat is adapted for mounting said element, with said first pressure seal, by way of said first compartment, and in which said element is disposed in said first compartment when mounted.

7. Housing apparatus according to claim 1 in which said mounting seat further includes fastening threads for said removable and replaceable mounting of said element to said mounting seat.

8. Housing apparatus according to claim 1 in which at least one axial end of said body is threaded for removable and replaceable assembly with an end-cap for selectively closing said one end of said body.

9. Housing apparatus according to claim 8 further comprising
   A. a threaded end-cap for removable and replaceable assembly with said one end of said body for forming a second pressure seal between said cap and said one end, said end-cap having a substantially cylindrical outer surface with radial recesses therein circumferentially spaced about said outer surface, and
   B. a stem threadably mounted on said body, and having axially-spaced first and second portions for selectively engaging said first portion in one said radial recess of said end-cap for precluding rotation of said end-cap relative to said body.

10. Housing apparatus according to claim 9 further comprising means for precluding said stem from rotating to disengage said first portion from said one radial recess.

11. Housing apparatus according to claim 9 further comprising
    A. a threaded aperture for receiving said stem, said threaded aperture being located adjacent said one end of said body and extending axially along an axis parallel to said first axis, wherein said stem mounts in said threaded aperture so that said first portion of said stem protrudes from said threaded aperture and selectively engages one said radial recess in said end-cap, and said second portion threadably seats within said threaded aperture, and
    B. a passage extending radially through said threaded aperture for threading a filament there through to engage said second portion to preclude removal of said stem from engagement with a radial recess of said end-cap.

12. Housing apparatus according to claim 1 in which said port includes a collar on said body and extending along said second axis, said collar having a through passage communication with said second compartment, said collar having a tubular outer surface for seating a label and having radial projection for fixing a rotational position of said label.

13. Housing apparatus according to claim 12 in which said tubular outer surface has a radial recess for interfitting with and seating said label.

14. Housing apparatus according to claim 12 further comprising a label mounted about said collar and having a notch seated on said radial projection for fixing the rotational position of said label.

15. Housing apparatus according to claim 12 further comprising a label having fastening means for removably and replaceably fastening said label to said tubular outer surface of said collar.

16. Housing apparatus according to claim 1 further comprising an electro-mechanical terminal-block fitting removable and replaceable relative to said first compartment by way of said first open end and having a mounting portion for removably and replaceably seating with said mounting seat, for selectively mounting said terminal-block fitting relative to said wall member with said first pressure seal between said first and second compartments.

17. Housing apparatus according to claim 16 in which said terminal-block fitting includes a selected set of first electrical terminals arranged for removable and replaceable connection, with electrical conductors, from said first compartment when said terminal-block fitting is mounted to said wall member.

18. Housing apparatus according to claim 17 in which said terminal-block fitting includes a selected set of second electrical terminals in electrical circuit communication with said first electrical terminals and arranged for removable and replaceable connection from said second compartment when said electrical terminal-block fitting is mounted to said wall member.

19. Apparatus according to claim 18 in which said terminal-block fitting spans said aperture in said wall member when mounted to said wall member and has a planar annular surface that forms said mounting portion, and in which said second electrical terminals are located within said annular surface.

20. Apparatus according to claim 15 in which said mounting seat includes a planar surface facing along said first axis into said first compartment for removably and replaceably seating said terminal-block fitting with said first pressure seal to said planar annular surface.

21. Apparatus according to claim 15 in which said mounting seat further includes fastening threads for said removable and replaceable mounting of said terminal-block fitting, and said mounting portion of said terminal-block fitting includes a plurality of apertures for axial alignment and mounting engagement with said fastening threads.

22. Housing apparatus according to claim 16 in which said terminal-block fitting includes,
   A. a terminal block having first and second opposed sides with a selected set of first electrical terminals arranged on said first side, and
   B. a printed circuit board having first and second opposed sides, said first side of said printed circuit board mounting iaid second side of said terminal block and having means for electrical connection to said first electrical terminals, said second side of said printed circuit board having a selected set of second electrical terminals in electrical circuit communication with said first electrical terminals.

23. Housing apparatus according to claim 1
   A. in which said body forms said second compartment with a tubular wall extending axially along said first axis to said second end of said body, and
   B. further comprising a second mounting seat in said second compartment for removably and replaceably mounting a second element with a second pressure seal to said second mounting seat to divide said second compartment into a first cavity containing said port and a second cavity.

24. Housing apparatus according to claim 23 in which said second mounting seat comprises a radial shoulder projecting radially inward from said tubular wall, and a smooth inner surface on said tubular wall extending circumferentially around said second compartment and extending axially along said. first axis from said shoulder toward said second end of said body.

25. Housing apparatus according to claim 23 in which said second mounting seat comprises at least one threaded fastening member for said removable and replaceable mounting of said second element to said second mounting seat.

26. Housing apparatus according to claim 1
   A. in which said body forms said second compartment with a tubular wall extending axially along said first axis to said second end of said body,
   B. further comprising a second mounting seat in said second compartment for removably and replaceably mountingly seating a second element with a second pressure seal to said second mounting seat to divide said second compartment into a first cavity containing said port and a second cavity, and
   C. further comprising a first circuit assembly removable and replaceable relative to said second compartment by way of said second open end and having a mounting portion removably and replaceably seated with said second mounting seat, for selectively mounting said first circuit assembly relative to said second mounting seat with said second pressure seal between said first and second cavities.

27. Housing apparatus according to claim 26
   A. in which said first circuit assembly and said second mounting seat engage to form said second pressure seal, and
   B. further comprising an electro-mechanical terminal-block fitting removably and replaceably seated with said mounting seat for selectively mounting said terminal-block firing relative to said wall member with said first pressure seal between said first and second compartments, and wherein said first pressure seal has a selected greater pressure strength than said second pressure seal.

28. Housing apparatus according to claim 23
   A. in which said second mounting seat comprises at least one threaded fastening member for said removable and replaceable mounting of said second element to said second mounting seat, and
   B. further comprising a first circuit assembly removable and replaceable relative to said second compartment by way of said second open end and having a mounting portion including a plurality of through apertures for axial alignment with said fastening member for mounting said first circuit assembly to said second mounting seat.

29. Housing apparatus according to claim 27 further comprising fastening means for removably and replaceably fastening said first circuit assembly to said fastening member by way of said through apertures to realize said second pressure seal between said first and second cavities, and wherein said fastening means releases said pressure seal by way of said through aperture, upon being unfastened from said fastening member.

30. Housing apparatus according to claim 26 in which said first circuit assembly comprises
   A. a mounting bezel having first and second opposed sides and a through aperture between said first and second sides, said first side including at least one axial projection located on the periphery of said through aperture and extending along an axis normal to said first side, and adapted as a finger grip for removal and installation of said second circuit assembly by way of said second open end,
   B. a display mounted to said second side of said mounting bezel and visible from said first side by way of said through aperture, and
   C. at least one primed circuit board mounted on said second side of said mounting bezel and in electrical communication with said display.

31. Housing apparatus according to claim 30
   A. further comprising an electro-mechanical terminal-block fitting having a mounting portion for removably and replaceably seating with said mounting seat, said terminal-block fitting including first electrical terminals accessibly disposed in said first compartment when said terminal-block fitting is mounted to said wall member, and
   B. said printed circuit board of said first circuit assembly includes a set of electrical terminals for removable and replaceable connection with said set of first electrical terminals of said terminal-block fitting.

32. Housing apparatus according to claim 26 in which said first circuit assembly includes
   A. a mounting housing having first and second opposed sides, said first side having at least one axial projection accessible as a finger hold for installation and removal of said first circuit assembly relative to said second compartment by way of said second open end, said second side having a plurality of mounting supports projecting axially from and spaced along the periphery of said second side and each having one or more lateral slots and
   B. at least one printed circuit board adapted to interfit with and seatingly engage one said slot in each said mounting support to seat said circuit board in said mounting housing.

33. Housing apparatus according to claim 32

A. further comprising an electro-mechanical terminal-block fitting removable and replaceable relative to said first compartment by way of said first open end and having a mounting portion for removably and replaceably seating with said mounting seat, for selectively mounting said terminal-block fitting relative to said wall member with said first pressure seal between said first and second compartments, said terminal-block fitting including first electrical terminals arranged for removable and replaceable connection from said first compartment when said terminal-block fitting is mounted to said wall member, and B. wherein said printed circuit board further comprises second electrical terminals arranged for removable and replaceable connection with said first terminals of said terminal-block fitting.

34. Housing apparatus according to claim 32 in which said mounting housing includes electrical feed-through connections formed between said first and second opposed sides of said mounting housing, said feed-through connections being in electrical circuit communication with said printed circuit board by way of said second side of said housing, and arranged to provide electrical circuit communication between said printed circuit board and said second cavity by way of said first side of said housing when said first circuit assembly is mounted in said second compartment.

35. Housing apparatus according to claim 34

A. in which said second mounting seat comprises a radially extending shoulder on said tubular wall, and a smooth inner surface on said tubular wall extending circumferentially around said second compartment and extending axially along said first axis from said shoulder at least part way toward said second end of said body, and B. in which said mounting housing includes a collar extending circumferentially around the periphery of said first side of said mounting housing and extending axially along an axis normal to said first surface, said collar including means for forming said second pressure seal between said collar and said smooth inner surface, said collar further including mounting means for removably and replaceably seating a third element with a third pressure seal to divide said second cavity axially into a first portion containing said first circuit assembly and a second portion.

36. Housing apparatus according to claim 35 further comprising a second circuit assembly removable and replaceable relative to said second cavity by way of said second open end and having a mounting portion for removably and replaceably mounting to said mounting means of said collar with said third pressure seal.

37. Housing apparatus according to claim 36 in which said mounting means of said collar comprises a plurality of radially-extending first members circumferentially spaced in said collar, and said second circuit assembly comprises a mounting bezel having a corresponding plurality of radially-extending second members for removably and replaceably interfitting with said plurality of first members in said collar.

38. Housing apparatus according to claim 36 in which said second circuit assembly comprises, A. a mounting bezel having first and second opposed sides and a through aperture between said first and second sides B. a display mounted to said second side of said mounting bezel and visible from said first side by way of said through aperture, and C. at least one printed circuit board mounted on said second side of said mounting bezel and having first and second opposed sides, said first side abutting and in electrical communication with said display, said second side of said printed circuit board including a set of electrical terminals in circuit communication with said first side of said printed circuit board and said display, for removable and replaceable connection with said set of electrical feed through connections in said first circuit board assembly.

39. Housing apparatus according to claim 1

A. in which said body forms said first compartment with a tubular wall extending axially along said first axis to said first end of said body and B. further comprising one or more through fittings in said tubular wall, each of said through fittings communicating with said first compartment.

40. Selectively pressured housing apparatus for electrical elements, said housing apparatus having a body having a chamber therein extending along a first axis, said body being open at a first axial end and at a second axial end, and having a port extending along a second axis transverse to said first axis, said port communicating with said chamber, and at least a first end-cap for removably and replaceably closing one said end, said apparatus having the improvement comprising A. a wall member inside said body extending transverse to said first axis and parallel to said second axis and dividing said chamber into first and second compartments axially spaced along said first axis, said port communicating with said chamber at said second compartment, B. a first mounting seat in said second compartment for removably and replaceably seating an electrical element received into said chamber at said second open end, C. an aperture extending through said wall member and communicating between said first and second compartments, and D. a second mounting seat on said wall member and extending circumferentially about said aperture for removably and replaceably seating, with a first pressure seal to said wall member, an element received into said chamber at said first open end.

41. Housing apparatus according to claim 40 further comprising

A. a first circuit assembly removable and replaceable relative to said second compartment by way of said second open end and having a mounting portion removably and replaceably seated within said second compartment, in which said first circuit assembly and said second compartment have mating mounting-seat means for engagement, upon mounting of said circuit assembly in said second compartment, for forming a second pressure seal between the portion of said second compartment interior of said circuit assembly and the portion thereof exterior to said circuit assembly, and B. pressure release means on said first circuit assembly for maintaining said second pressure seal and, alternatively, for venting said second pressure seal to facilitate installation mad removal of said circuit assembly relative to said second compartment.

42. Housing apparatus according to claim 40 further comprising a first circuit assembly removable and replaceable relative to said compartment by way of said second open end and having a mounting portion removably and replaceably seated within said second compartment, said first circuit assembly having at least one manually-engageable projection extending longitudinal to said first axis, for manual removal and installation of said circuit assembly in said second compartment by way of said second open end.

43. Housing apparatus according to claim 42 in which said first circuit assembly has a pair of projections spaced apart along an axis transverse to said first axis and longitudinal to said second axis said pair of projections extending along said first axis toward said second end of said body and forming a pair of opposed manually engageable surfaces for the removal and alternative installation of said first circuit assembly relative to said second compartment.

44. Housing apparatus according to claim 1 in which said body forms said second compartment with a tubular wall extending axially along said first axis to said second end of said body, said apparatus further comprising, A. a second mounting seat in said second compartment for removably and replaceably mountingly seating a second element with a second pressure seal to said second mounting seat for dividing said second compartment axially into a first cavity containing said port and a second cavity, B. a first circuit assembly removable and replaceable relative to said second compartment by way of said second open end and having a mounting portion removably and replaceably seated with said second mounting seat, for selectively mounting said first circuit assembly relative to said second mounting seat with said second pressure seal between said first and second cavities, said first circuit assembly having a handle-like projection extending along said first axis towards said second end of said body and manually engageable for installation and alternatively removal of said first circuit assembly from said second compartment.

45. Housing apparatus for.eleCtrical elements comprising

A. a body having a chamber therein extending along a first axis,

B. a wall member inside said body extending transverse to said first axis and dividing said chamber into first and second compartments axially spaced along said first axis, C. an aperture extending through said wall member and connecting said first and second compartments, and D. a mounting seat on said wall member and extending circumferentially about said aperture and projecting along said first axis into said first compartment from said wall member to form, in said first compartment, a channel having a depth extending along said first axis and extending circumferentially around said mounting seat.

46. Housing apparatus according to claim 45 further comprising a terminal-block fitting removable and replaceable from said first compartment, and having a mounting portion for removably and replaceably seating with said mounting seat, for selectively mounting said terminal-block fitting relative to said wall member.

47. Housing apparatus according to claim 46 in which said terminal-block fitting includes a selected set of electrical terminals arranged for removable and replaceable connection, with electrical conductors, from said first compartment when said terminal-block fitting is mounted to said wall member, and in which said channel is adapted for storing an excess portion of said electrical conductors.

\* \* \* \* \*

UNITED STATES PATENT AND TRADEMARK OFFICE
CERTIFICATE OF CORRECTION

PATENT NO. : 5,656,782
DATED : August 12, 1997
INVENTOR(S) : Roger E. Powell, II et al.

It is certified that error appears in the above-identified patent and that said Letters Patent is hereby corrected as shown below:

At column 1, line 7, please replace ""Pressure Housing"" with --"Pressure Transmitter Housing"--;

At column 3, line 41, please replace "c6nstruction" with --construction--;

At column 4, line 3, please replace "apeme" with --aperture--;

At column 4, line 23, please replace "fittingrelative" with --fitting relative--;

At column 6, line 20, please replace "patent application" with --Patent Application--;

At column 8, line 12, please replace "apeme" with --aperture--;

At column 8, line 24, please replace "compartUnent" with --compartment--;

At column 9, line 66, please replace "220a" with --220a--;

At column 10, line 67, please replace "oft he" with --of the--;

At column 11, line 18, please replace "feai-ure" with --feature--;

At column 12, line 38, please replace "tam couples" with --turn couples--;

UNITED STATES PATENT AND TRADEMARK OFFICE
CERTIFICATE OF CORRECTION

PATENT NO. : 5,656,782
DATED : August 12, 1997
INVENTOR(S) : Roger E. Powell, II et al.

It is certified that error appears in the above-identified patent and that said Letters Patent is hereby corrected as shown below:

At column 17, line 14, please replace "iaid second" with --said second--;

At column 17, line 35, please replace "said. first" with --said first--;

At column 18, line 1, please replace "terminal-block firing" with --terminal-block fitting--;

At column 19, lines 7 and 12, please replace "terminai-block" with --terminal-block--; and At column 22, line 4, please replace "for.eleCtrical" with --for electrical--.

Signed and Sealed this

Fifteenth Day of September, 1998

Attest:

BRUCE LEHMAN

Attesting Officer

Commissioner of Patents and Trademarks